Oct. 11, 1938.   D. W. BOYLAN ET AL   2,133,015
PIPE LINING OR COATING MACHINE
Filed Oct. 28, 1936   7 Sheets-Sheet 2
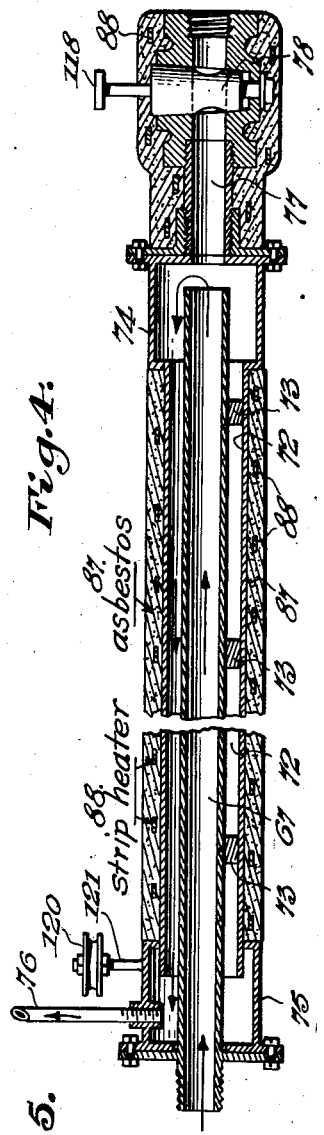
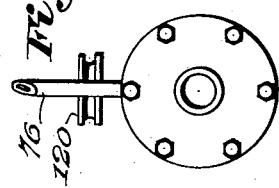
INVENTORS
David W. Boylan,
Clifford F. Morain,
Otto R. Bowman.
BY
ATTORNEY.

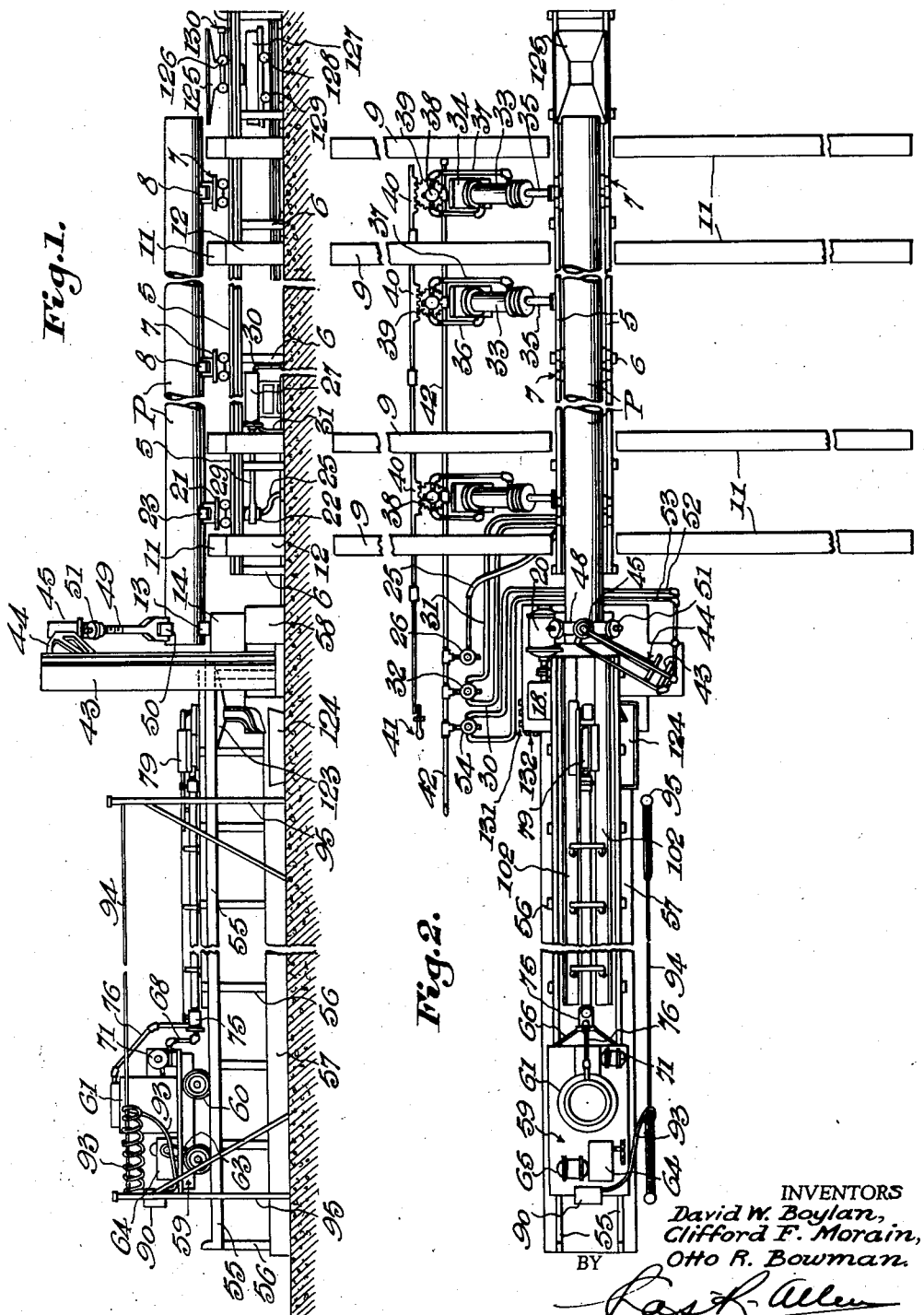

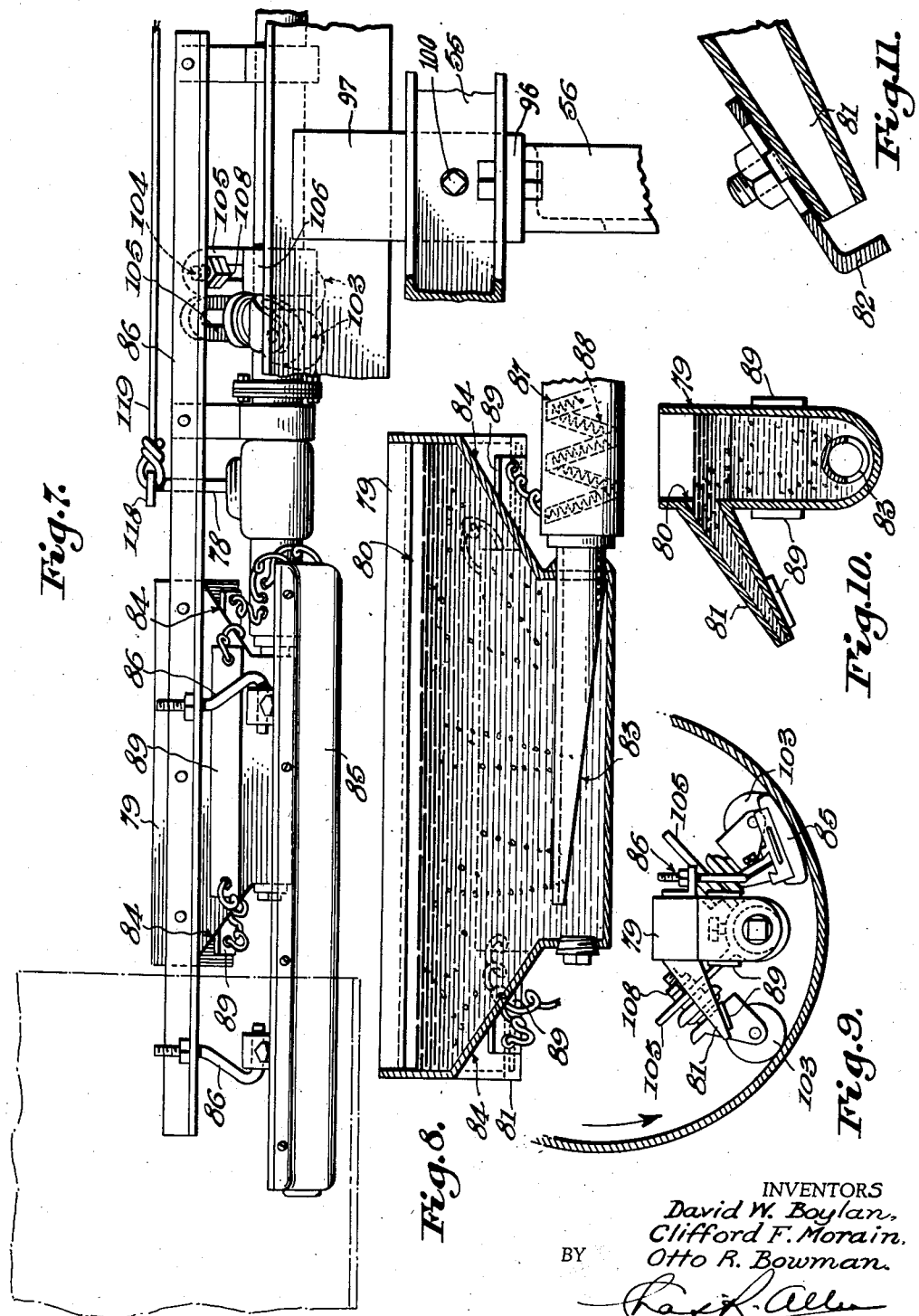

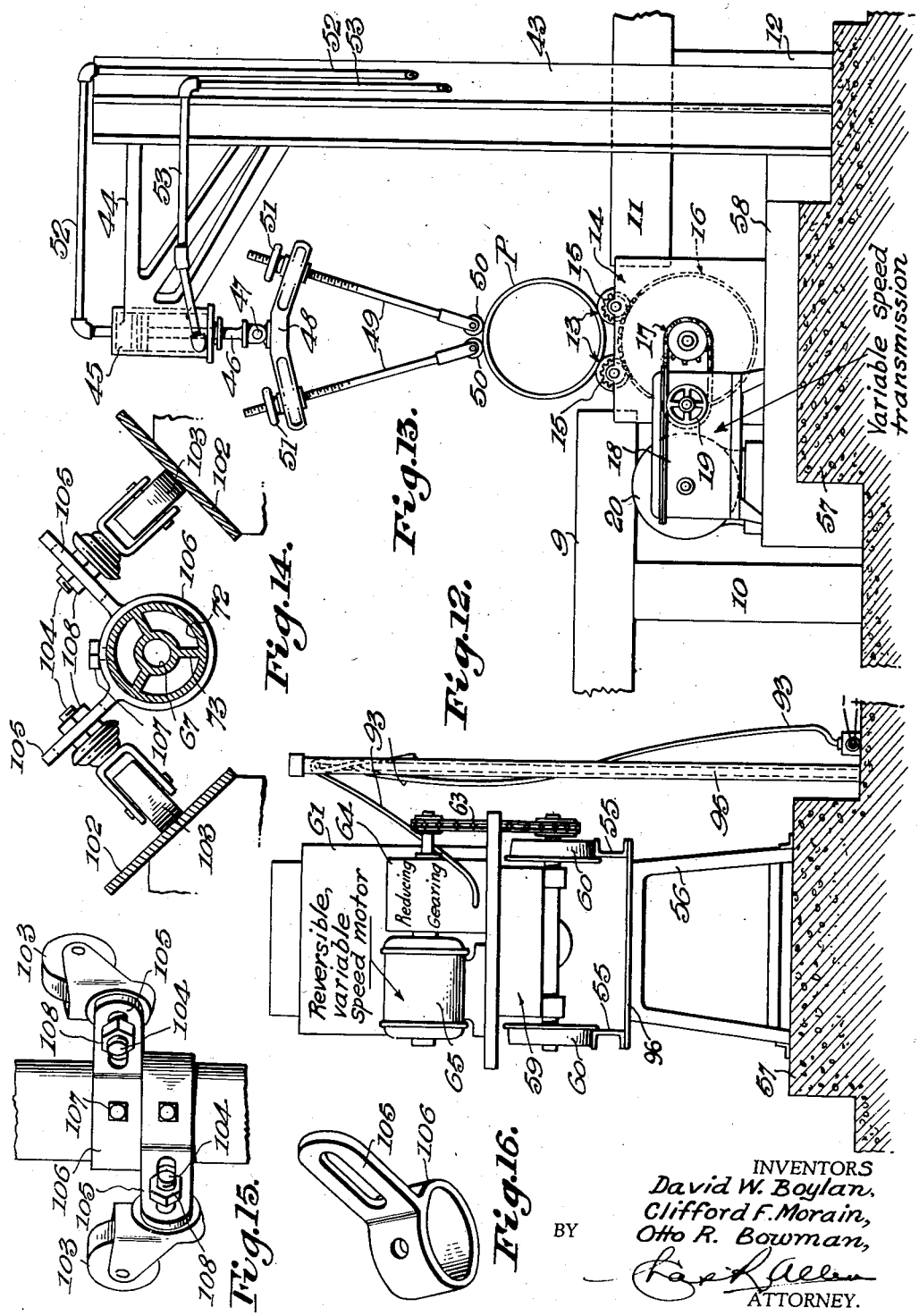

Oct. 11, 1938.    D. W. BOYLAN ET AL    2,133,015
PIPE LINING OR COATING MACHINE
Filed Oct. 28, 1936    7 Sheets-Sheet 5
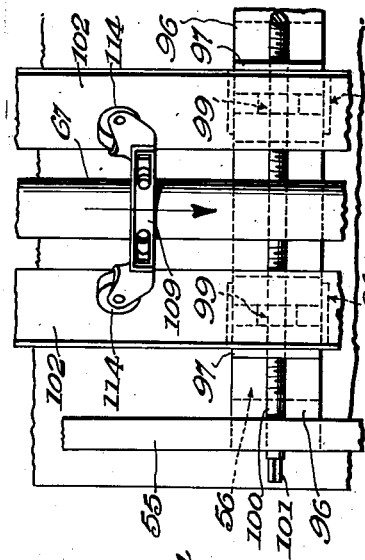
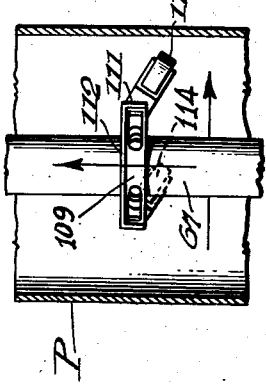
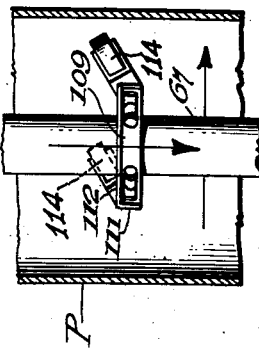
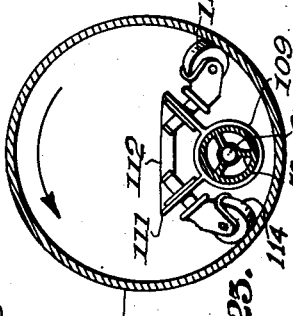
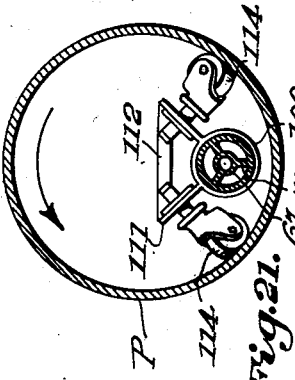
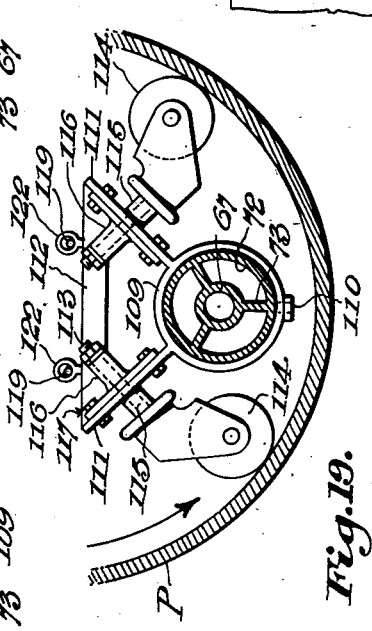
INVENTORS
David W. Boylan,
Clifford F. Morain,
Otto R. Bowman,
BY
ATTORNEY.

Oct. 11, 1938. D. W. BOYLAN ET AL 2,133,015
PIPE LINING OR COATING MACHINE
Filed Oct. 28, 1936 7 Sheets-Sheet 6
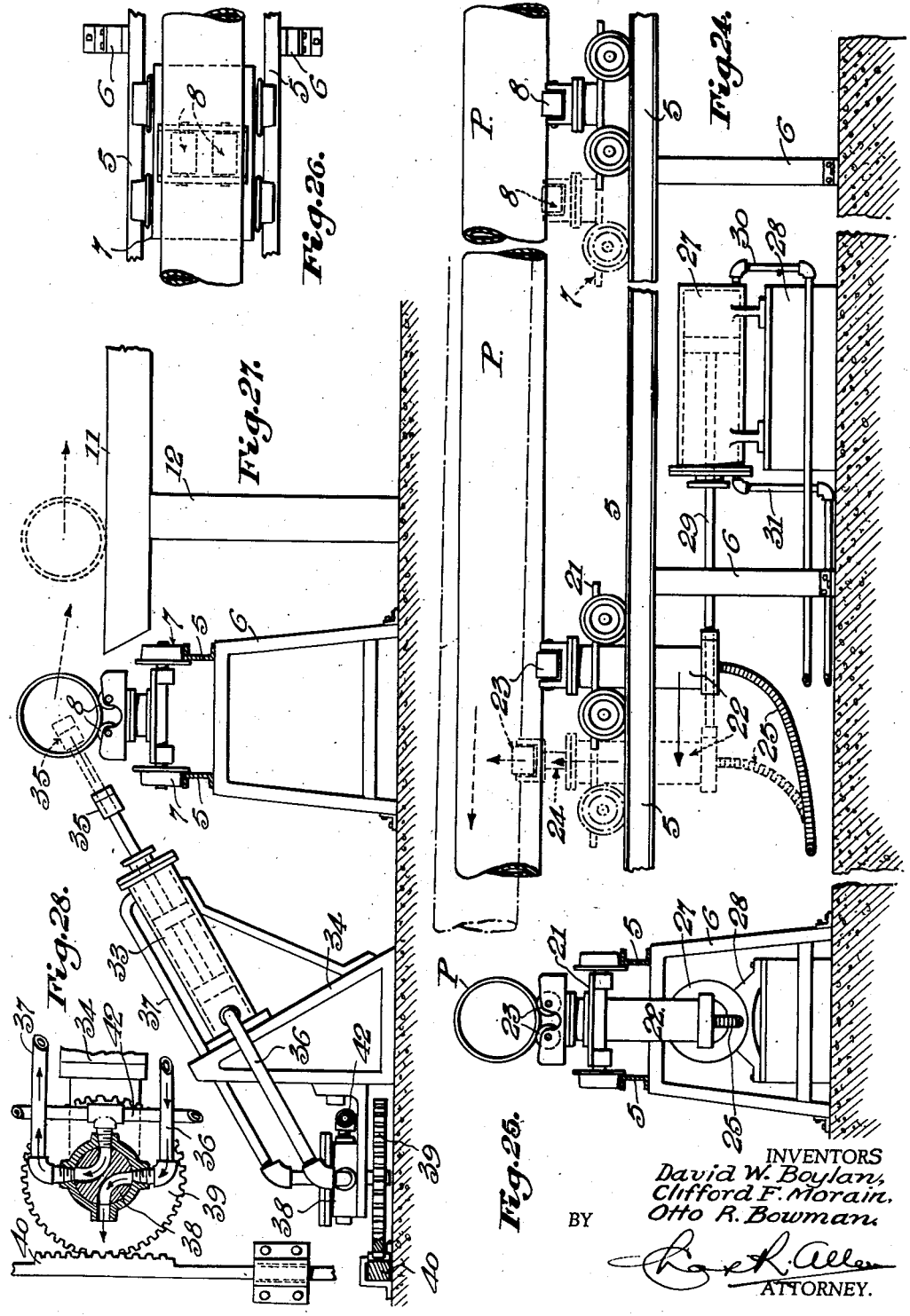
INVENTORS
David W. Boylan,
Clifford F. Morain,
Otto R. Bowman
BY
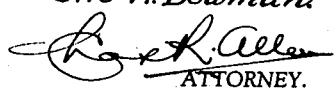
ATTORNEY.

Oct. 11, 1938.    D. W. BOYLAN ET AL    2,133,015
PIPE LINING OR COATING MACHINE
Filed Oct. 28, 1936    7 Sheets-Sheet 7
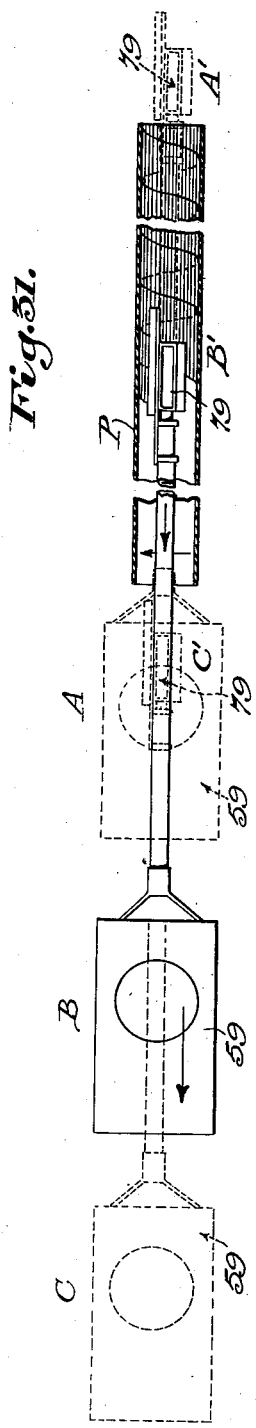
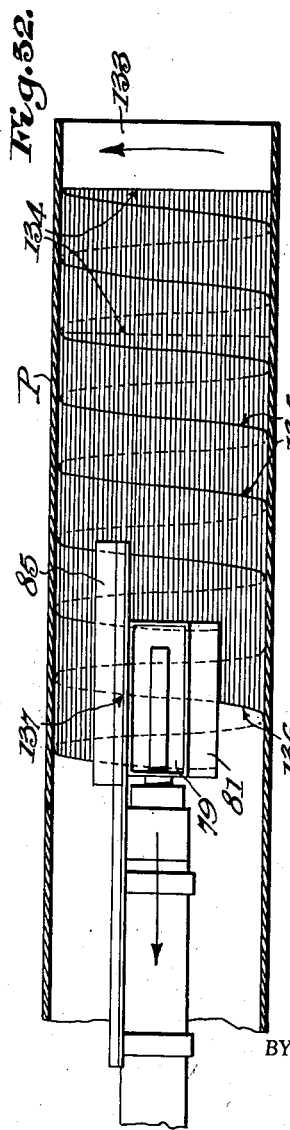
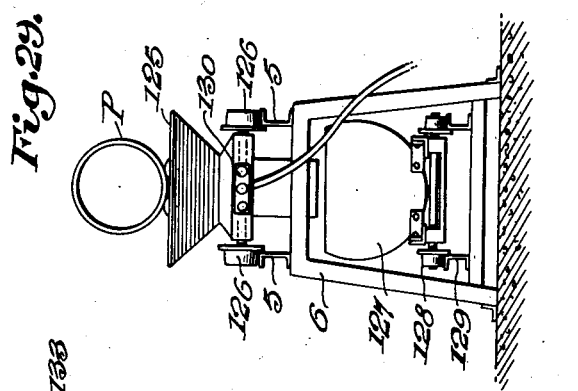
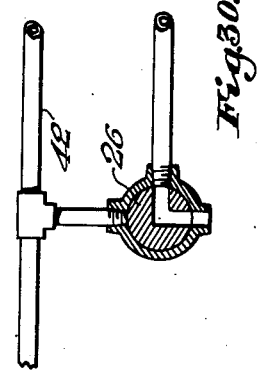
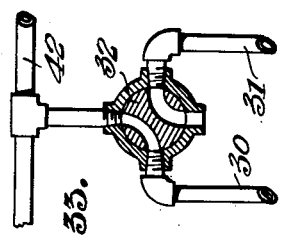
INVENTORS
David W. Boylan,
Clifford F. Morain,
Otto R. Bowman,
BY
ATTORNEY.

Patented Oct. 11, 1938

2,133,015

UNITED STATES PATENT OFFICE 2,133,015

PIPE LINING OR COATING MACHINE

David W. Boylan, San Francisco, Calif., Clifford F. Morain, Youngstown, Ohio, and Otto R. Bowman, Chicago, Ill., assignors to General Paint Corporation, San Francisco, Calif., a corporation of Nevada Application October 28, 1936, Serial No. 108,110

33 Claims. (Cl. 91—30)

The invention relates generally to the art of interiorly coating or lining pipes, particularly those intended for use in water conduits, and primarily seeks to provide a new and improved machine for efficiently practicing this art.

It is well known that pipes and tubing formed of known materials are subject to rust and corrosion, and that piping adapted for water conduits, either steel, cast iron or concrete, when used without suitable internal pre-treatment, is subject to the formation of tubercles. Tuberculation is no small factor to be considered by engineers in constructing water lines. Records are available which show that the supply of water to a city can be reduced as much as 10% by reason of the constriction of the internal diameter of the conduit by tubercle formation. While the machine embodying the inventive features herein disclosed is adaptable to more general application, it is designed principally for the lining of pipes and serves to apply to the internal surfaces of the pipes a heavy velvety ribbon of hot bituminous enamel in a manner ultimately resulting in the provision of a thick and very smooth lining such as will definitely prevent tuberculation and reduce to a minimum frictional resistance to fluid flow.

In its more detailed nature, the invention resides in the provision of novel means for supporting, rotating and otherwise handling the pipes to be coated, supporting trackways, a coating applicator, and a truck carrying the coating material connected with the applicator through the medium of a long flow and return conduit and movable back and forth along and supported on the trackways for projecting the applicator through and properly again withdrawing it in timed relation from the rotating pipe-to-be-coated.

Another object of the invention is to provide a novel form of flow and return conduit, novel means for supporting the conduit upon the trackways and in the pipe-to-be-coated, and novel means for maintaining the coating material in the desired hot, fluid condition and for suitably controlling its flow to the applicator.

Another object of the invention is to provide means by which relative speeds of longitudinal movement of the applicator and relative movement of the pipe-to-be-coated can be variably determined.

With the above and other objects in view which will hereinafter appear, the invention further resides in the novel details of construction, combination and arrangement of parts, all of which will be first fully described in the following detailed description, then be particularly pointed out in the appended claims, reference being had to the accompanying drawings.

In the drawings:

Figure 1 is a somewhat diagrammatic right side elevation illustrating the invention, Figure 2 is a somewhat diagrammatic plan view illustrating the invention, Figure 3 is a detail left side elevation of the coating material carrying truck, Figure 4 is a longitudinal section of the heated coating material flow and return conduit, Figures 5 and 6 are rear and front elevations of the conduit shown in Figure 4, Figure 7 is a detail left side elevation of the coating material applicator and fragments of the supporting devices associated therewith, Figure 8 is a detail longitudinal section of the applicator, Figure 9 is a front end elevation of the applicator shown in Figure 7, Figure 10 is a central vertical cross section of the applicator, Figure 11 is an enlarged detail cross section illustrating a means by which the applicator lip may be made adjustable, Figure 12 is a rear end elevation of the truck and its supporting trackage, Figure 13 is a vertical cross section of the machine looking forward at the position of the means for imparting rotation to the pipe-to-be-coated, Figure 14 is a detail vertical cross section of the flow and return conduit supporting trackage, the form of caster mounting embodied in Figure 7 being shown, Figure 15 is a detail plan view illustrating the caster mounts shown in Figure 14, Figure 16 is a detail perspective view of one of the caster mounts shown in Figures 7, 9, 14 and 15, Figure 17 is a vertical cross section of the machine looking rearward at the end of the conduit supporting trackage adjacent the pipe rotating mechanism, a modified form of caster mount being shown, Figure 18 is a plan view of a section of the trackage shown in Figure 17, Figure 19 is a detail vertical cross section of a fragment of rotating pipe with the coating material flow and return conduit supported therein, the caster mount of Figure 17 being embodied thereon, Figures 20 and 21 respectively illustrate in horizontal and vertical cross section the positions which the parts shown in Figure 19 assume when the conduit is moving forwardly through the rotating pipe, Figures 22 and 23 respectively illustrate in horizontal and vertical cross section the positions which the parts shown in Figure 19 assume when the conduit is being withdrawn rearwardly through the rotating pipe, Figure 24 is a right side elevation of a portion of the trackage for supporting pipes-to-be coated, pipe lifting and shifting means being shown, Figure 25 is a left end elevation of the parts shown in Figure 24, Figure 26 is a plan view illustrating a section of trackage and one of the dollies shown in Figure 24, Figure 27 is a detail vertical cross section looking forwardly of the position of one of the pipe discharging devices, Figure 28 is a detail horizontal section illustrating one form of valve adapted for controlling the operation of the pipe discharging device, Figure 29 is a front end elevation illustrating the waste collecting truck, Figure 30 is a detail horizontal section illustrating a form of valve adapted for controlling the lifting of pipe sections, Figure 31 is a diagrammatic horizontal section illustrating positions of the coating applicator before the start, during, and after the conclusion of the coating of a pipe section, Figure 32 is an enlarged diagrammatic horizontal section illustrating the application of the pipe coating or lining, and Figure 33 is a detail horizontal section illustrating a form of valve adapted for controlling the longitudinal shifting of pipe sections.

While the invention might readily be adapted to the external coating of pipes, it is designed principally for internal coating or lining purposes. During the lining of a pipe the pipe is rotated about its axis and a coating material applicator is moved longitudinally through the pipe to flow onto the internal surface thereof a helical ribbon of hot bituminous lining material. The applicator is connected with a mobile truck containing the coating material and suitable trackage is provided for supporting the truck and which alines with similar trackage forming a part of novel pipe supporting means.

The pipe supporting trackage includes parallel rails 5 supported upon frame standards 6. Wheeled supporting dollies 7 are movable along the rails 5 as illustrated in Figures 1 and 24 of the drawings, and each includes a pair of parallel spaced rollers 8 for rotatably supporting a pipe-to-be-coated. At the left side of the pipe supporting trackage there are provided a plurality of skids or feed-on rails 9, mounted on suitable standards 10, for supporting a plurality of pipes-to-be-coated and facilitating the feeding thereof onto the supporting dollies 7. See Figures 2 and 13. A similar arrangement of feed-off rails 11, supported upon standards 12, is provided at the right hand side of the rails 5 to facilitate delivery of the pipes after they are coated. See Figures 2, 13 and 27. It will be noted that the feed-on rails 9 are disposed on a plane higher than that occupied by the pipe supporting rollers 8, whereas the take-off rails 11 are positioned slightly lower than said rollers.

For imparting rotation to a pipe-to-be-coated, we provide a pair of driven rollers 13 forming a part of a centrally disposed drive unit 14. It will be obvious that when a pipe is resting upon the idler dolly rollers 8 and upon the drive rollers 13, as shown in Figure 1 of the drawings, rotation imparted to said drive rollers will be frictionally transmitted to said pipe causing it to rotate about its axis.

It will be observed by reference to Figure 13 of the drawings that the drive rollers 13 are equipped with pinions 15 to which rotation is imparted through the medium of a single large pinion 16 and power transmitting connections 17 from any conventional form of variable speed transmission generally designated 18 and which includes the usual handwheel or other form of speed controlling device indicated at 19. The variable transmission 18 is driven from a motor 20 or any other suitable power source.

One of the pipe supporting dollies, designated 21, is equipped with a vertically disposed, depending pneumatic lift cylinder 22, and the idler rollers 23 of this dolly are carried at the upper end of a plunger 24 operable in the cylinder. The cylinder is connected by a flexible line 25 with the air source common to various other controls to be described hereinafter, and the flow of pressure fluid into the cylinder, and the exhausting thereof from the cylinder, is controlled by a suitable valve 26. See Figures 2, 24, 25 and 30.

Another pneumatic cylinder 27 is horizontally supported as at 28 beneath and between the rails 5 and its plunger 29 is connected to the vertically disposed cylinder 22. Pressure is supplied to and released from opposite sides of the head of the plunger 29 through pipe lines 30 and 31, a valve 32, as shown in Figure 33, serving to control the flow of pressure fluid to and from said pipe lines.

When it is desired to coat a pipe, it is rolled off the skids or rails 9 onto the dolly rollers 8 and 23. Fluid pressure is admitted through the flexible line 25 serving to lift the rollers 23 and the pipe thereon as indicated in dotted lines in Figure 24. After the pipe is thus lifted, pressure fluid is admitted through pipe line 30 behind the plunger 29 of the pneumatic 27 serving to longitudinally shift the pipe as indicated in Figure 24 to position the rearwardly disposed end thereof over the driving rollers 13 as shown in Figure 1. By exhausting the fluid from the cylinder 22 the pipe may be lowered onto the drive rollers in position for being rotated thereby and suitably alined for receiving the longitudinally movable coating material applicator.

After a pipe has been internally coated or lined, it is discharged from the rails 5 and dollies 7 onto the receiving, take-off rails 11. In order to facilitate this removal, we provide a plurality of ejector pneumatics 33 disposed at spaced intervals along the left side of the trackage 5 as illustrated in Figures 1 and 27 of the drawings. The pneumatic cylinders 33 are supported as at 34 and the plungers 35 thereof are presented for engagement with the pipe supported upon the trackage as shown in Figure 27. Pressure fluid is supplied to and released from the opposite sides of the plunger heads within the cylinders through pipe lines 36 and 37 under the control of individual valves 38. Each valve 38 includes an operating gear 39, and a rack 40 engages each gear, all said connections being movable with a common rod longitudinally shiftable through the medium of a shifter lever 41 disposed centrally of the machine as is diagrammatically illustrated in Figure 2 of the drawings. By suitably shifting the valves 38 the pneumatics 33 may be simultaneously actuated for discharging a coated pipe in the manner illustrated in Figure 27 of the drawings.

Pressure fluid is supplied to the pneumatic 33 from a fluid pressure line 42 and this line is common to all pressure controls including the pneumatics 22 and 27 hereinbefore referred to and which are under control of the valves 26 and 32 respectively.

Centrally of the machine, at the right side of the mechanisms which apply rotation to the pipe-to-be-coated as hereinbefore described, there is provided a standard 43 which carries a bracket arm 44 overhanging the pipe driving rollers 13 and which supports a pneumatic cylinder 45 having its axis vertically disposed and centered over said driving rollers. The pneumatic plunger 46 depends from the cylinder and is pivoted as at 47 to a cross-head 48 disposed transversely of the machine. At each end the cross-head carries a threaded rod 49, and the lower end of each rod is provided with a holddown roller 50 adapted to exert a pressure downwardly on a pipe-being-coated as shown in Figures 1 and 13 of the drawings. By utilizing the thread adjustment of the rods 49 it is possible to present either one or both of the pressure rollers 50 for engagement with the pipe-to-be-coated. When large pipes are being coated engagement by both the rollers is preferable, whereas when smaller pipes are being coated the use of a single roller 50 will suffice. Handwheels 51 may be mounted on the rods 49 and utilized in the manner of jamb nuts for securing adjustments of the rods 49.

By supplying and exhausting pressure at opposite sides of the head of the plunger 46 within the pneumatic cylinder 45, as by utilizing the pipe lines 52 and 53 and the control valve 54, the roller or rollers 50 may be quickly presented for engagement with the pipe surface as shown in Figure 13 or removed from such engagement. The control valve 54 may be identical in construction with the valve shown in Figure 33.

Thus far we have described only the pipe supporting and rotating devices and the means for facilitating the feeding of the pipes onto and from the supporting trackage and for properly placing the pipes on said trackage.

The coating applicator and truck supporting trackage includes parallel rails 55 longitudinally alined with the rails 5 of the pipe supporting trackage and supported upon frame standards 56 suitably anchored upon the raised foundation 57 extending along the rearward portion of the machine and which merges into the raised platform 58 which supports the pipe driving mechanism centrally of the machine.

The mobile truck generally designated 59 includes supporting wheels 60 for engaging the truck rails 55 and is equipped with a container 61 for the coating material. The coating material which we prefer to employ is bituminous enamel and is applied hot. For this purpose the container 61 is suitably insulated to protect it against heat losses by radiation and there is provided a suitable heater generally designated 62 and which may be of any approved type, preferably an electrical resistance heater.

Rotation may be imparted to wheels of the truck for moving it back and forth along the trackage 55 through suitable transmission connections 63 and any suitable reduction gearing generally designated 64 from a reversible, variable speed motor 65, see Figures 1, 2, 3 and 12.

A coating material flow and return conduit is secured as at 66 to the truck and extends along the trackage 55 as shown in Figures 1 and 2 of the drawings. The conduit includes an inner flow tube 67 which is connected by a supply line 68 with the lower portion of the container 61, a pump 69 being included in the supply line for supplying the coating material under pressure. The pump is driven by reduction gearing 70 from the motor 71 mounted on the truck.

The flow tube 67 is surrounded by a larger return tube 72 which is spaced as at 73 from the inner flow tube so as to provide an outer return duct leading from the feed header 74 into which the flow tube 67 discharges back into the rear header 75 and from thence through the return pipe line 76 into the upper portion of the container 61. See Figures 3 and 4.

At its forward or discharge end the conduit is connected through a short pipe line 77, in which is included a control valve 78, with the coating material applicator generally designated 79. See Figures 4, 7 and 8. The applicator is in the nature of a trough-like body having a longitudinal flow throat 80 leading into a laterally directed discharge lip 81 the degree of opening of which may be varied by employment of an adjustable slide valve indicated at 82 in Figure 11.

The pipe line through which the coating material is delivered into the applicator 79 extends into the bottom portion of the trough-like body as shown in Figure 8, and is provided with a longitudinal gradually increasing, downwardly directed cut-out 83 which serves to gradually release the pressure under which the material is supplied and thus eliminate turbulence such as might tend to form air bubbles. The air bubble elimination is further facilitated by flaring the applicator walls as at 84 thus permitting rapid dispersion of such air bubbles as might form in the coating material within the applicator. The overlapped helical ribbon portions applied by the applicator are ironed out or pressed by an ironer generally designated 85 and which is supported as indicated at 86 in fixed relation to the applicator.

The specific applicator and ironer combination above referred to is claimed in another application, being that filed by David W. Boylan and Clifford F. Morain on October 28, 1936, for Pipe coating apparatus, Serial No. 108,108, and it is thought to be unnecessary further to dwell upon the details of these structures. The specific details of construction of the ironing device per se are claimed in the application of David W. Boylan for Pipe coating ironer, filed October 28, 1936, Serial No. 108,107. The method of pipe coating or lining herein described likewise is covered by another application, being that of David W. Boylan for Method of coating or lining pipes, filed October 28, 1936, Serial No. 108,105.

In order to retain the coating material in the desired heated condition the flow and return conduit through which the coating material flows from and returns to the container 61, is provided with an asbestos or other suitable heat insulating cover 87 in which is embedded suitable heating means, preferably an electrical strip heater 88 of the resistance type coiled about the piping as indicated in Figures 4 and 8 of the drawings. This heating medium may be suitably connected with the power source and controls carried by the mobile truck as indicated in Figure 3 of the drawings and with the strip heaters 89 suitably affixed to the applicator, the latter being described in the Boylan and Morain application referred to heretofore.

A power box 90 is supported on the truck 59 and suitable connection with the truck motors 65 and 71 is made including speed controls 91 of any approved type. The truck is also equipped with stop, start, and reverse control buttons diagrammatically indicated at 92 and which comprise any suitable conventional control of this character connected with the power source and with the motor 65 so that travel of the truck along the trackage 55 can be started, stopped, or be reversed as to direction at the will of an operator.

The power input line indicated at 93 is preferably festooned along a supporting line 94 disposed along the right hand side of the trackage 55 and carried by standards or columns 95 as indicated in Figures 1 and 2 of the drawings.

The trackage rails 55 are supported on bars 96 disposed transversely upon the standards 56, and upon each such bar, except the one at the end of the machine as shown at the right in Figure 3 is mounted a pair of spaced, laterally slidable blocks 97, each block including a pair of depending guide plates 98 which overlie the bar at each side thereof as shown in Figures 17 and 18 of the drawings. Each block is grooved to receive a captive nut 99, and a reversely threaded screw 100 passes through each pair of nuts so that when the screw is rotated in one direction or another the blocks of each pair will be moved toward and from each other according to the direction in which the screw is rotated. For this purpose the screw is provided with a squared end 101 to which a turning crank may be applied.

A track rail 102 is secured to the blocks collectively disposed at each side of the center of the trackage and thus when the sets of blocks are moved toward and from each other the parallel spaced relation of the rails 102 may be varied. The rails serve to support the flow and return conduit as it is moved therealong when the applicator is being inserted into or withdrawn from the pipe-to-be-coated.

The flow and return conduit, when moving along the trackways 102 as shown in Figures 1, 2, 7, 14, 17 and 18, or when in the pipe-to-be-coated as shown in Figures 9, 19, and 20 to 23, are supported upon casters.

In Figures 7, 9, 14, 15 and 16, we have disclosed one form of caster mounting in which the casters are designated 103 and the stems 104 thereof are mounted in slots in arms 105 projecting radially from the flow and return conduit. Each arm 105 projects from an individual collar or ring 106 which surrounds the flow and return conduit as shown in Figures 14, 15 and 16, and is suitably secured thereon, preferably in abutting relation as in Figure 15, by set screws 107. The stems are adjustably secured in position as indicated at 108. By turning the collars 106 about the axis of the conduit the radial projection of the arms 105 may be varied and by the utilization of the arm slots the distance of the stems from the conduit axis may be varied in accordance with the size of the pipe-being-coated.

In Figures 17 to 23 of the drawings, we have illustrated another form of caster mounting in which a single conduit encircling ring 109 is employed for cooperating with each pair of casters. The ring is clamped as at 110 and has two radially projecting arms 111 connected by a lateral brace 112. The stems 113 of the casters 114 are freely rotatable in spacer sleeves 115 and sleeve bearings 116 removably and/or adjustably secured as at 117 upon the radial arms 111.

The valve 78 is provided with a cross-handle 118 to which the ends of a control cable 119 are connected, said cable being looped about a pulley 120 mounted as at 121 upon the rear conduit header 75. See Figures 3, 4, 7 and 19. The cable may be guided through eyes 122 carried by the caster mounting units, and by manipulating the thus mounted cable, the control valve 78 for controlling the flow of coating material into the applicator 79 may be actuated from any point along the conduit.

It will be observed by reference to Figure 2 of the drawings that the conduit supporting rails 102 extend forwardly almost to the position of the pipe driving rollers 13 so as to deliver almost directly into the pipe-to-be-coated when supported upon said rollers. In the coating of pipes the truck is first moved to project the applicator all the way through the forward end of the pipe, the pipe then being rotated, the direction of travel of the truck is reversed and the applicator slowly withdrawn rearwardly through the pipe, coating or lining the interior thereof as it travels. In Figure 31 of the drawings, we have diagrammatically illustrated the relative positions of the truck and applicator before the commencement of the actual coating, during the actual coating, and after the completion of the coating. The position of the parts with the applicator projected through the forward end of the pipe prior to the beginning of actual coating is indicated at A, A⁴. A position of the truck and applicator during actual coating is indicated at B, B', and the position of these parts after the completion of actual coating is indicated at C, C'.

A waste collecting trough 123 is supported beneath the forward or delivery ends of the rails 102 in position for catching any drippings or flow of coating material from the applicator when it is withdrawn rearwardly from the pipe at the completion of the lining or coating process. The trough delivers laterally into a catch pan 124 disposed at the right hand side of the machine as illustrated in Figures 1, 2 and 17.

A similar waste trough 125 is disposed at the front end of the pipe supporting trackage for catching any drippings or flow of coating material when the applicator 79 is projected through the forward end of the pipe as indicated at A' in Figure 31. In order to adapt the trough 125 for use in connection with random lengths of pipe it is suitably supported upon wheels 126 which ride the rails 5 and enable an attendant to readily position the catch trough beneath the forward end of the pipe-to-be-coated, as shown in Figures 1 and 2 of the drawings. The trough 125 delivers into a mobile waste collecting device 127 mounted on wheels 128 and supporting tracks 129 mounted beneath the forward ends of the rails 5, as shown in Figures 1 and 29. Like the trough 125 the device 127 may be readily shifted by the attendant and the trough 125 includes a control set of stop, start and reverse buttons diagrammatically indicated at 130 which are connected with the power source and the truck driving motor 65.

An additional set of stop, start and reverse buttons is disposed centrally of the machine as diagrammatically illustrated at 131 in Figure 2 of the drawings. In this manner it is possible to stop or start and to control the direction of travel of the truck 59 along the rails 55 at three distinct points, namely, at the position of the truck at 92, at the front end of the machine at 130, and at the center of the machine at 131.

All of the generally employed controls are centralized at the center of the machine as diagrammatically illustrated in Figure 2 of the drawings, namely, the lever 41 by which the pneumatics 33 are controlled for ejecting a coated pipe from the supporting trackage, the valve 26 and the valve 32 through the medium of which a pipe is first lifted and then longitudinally shifted into operative position upon the driving rollers, and the valve 54 by which the holddown rollers 50 are moved into or out of engagement with a pipe-to-be-coated. In addition, suitable stop and start control equipment diagrammatically illustrated at 132 is centrally located for starting and stopping the pipe driving motor 20.

In Figures 31 and 32 of the drawings, we have diagrammatically indicated the manner in which the pipe coating or lining is effected. The truck is first moved forwardly to project the applicator 79 through the front end of the pipe-to-be-coated as indicated at A' in Figure 31, and the valve control cable 119 may be manipulated to open the valve 78 and permit the hot bituminous enamel to flow into and through the applicator. The truck is then moved to slowly withdraw the applicator rearwardly through the pipe causing the applicator to apply a heavy velvety ribbon of coating material upon the internal surface of the rotating pipe. Should it be desired to leave a bare space at the end of the pipe in order to facilitate assembly coupling, the opening of the valve 78 may be delayed until the applicator A is withdrawn into the pipe a distance equivalent to the amount of annular bare space desired. Such a bare space is indicated at 133 in Figure 32. The valve may then be opened to permit an outflowing of coating material and after the ribbon has started to flow from the applicator lip 81 the pipe may be permitted to rotate once or twice before rearward longitudinal movement of the applicator is started so as to apply an annular transverse ribbon as indicated at 134 in Figure 32. The applicator is then withdrawn slowly rearwardly while the pipe P is being rotated about its axis causing the ribbon of coating material thereafter to assume a helical form. The speed of longitudinal movement of the applicator is so timed relative to the speed of rotation of the pipe that the individual helices are caused to overlap or shingle as indicated at 135, each helical portion preferably being centered upon the terminal edge 136 of the preceding helical portion as indicated at 137 in Figure 32.

It should be understood, by reason of the provision of the variable speed transmission 18, 19, that it is possible to vary the speed at which a pipe P is rotated. By reason of the provision of the controls 91, it is possible also to vary the speed of operation of the motors 65 and 71 to thus vary the speed at which the truck and the applicator are moved forwardly or rearwardly and the speed at which the pump 69 forces the hot bituminous coating material through the flow and return conduit.

It will be obvious from the foregoing, that the speed relations of the various moving parts may be varied to suit the conditions of use. It is preferred that the applicator be drawn along the pipe surface a distance of just half the width of the ribbon of coating material being applied for each revolution of the pipe as indicated in Figure 32. It is thus possible simultaneously to apply two coats of hot bituminous material to the interior of the pipe. It will be noted that the ironer 85 projects forwardly of the applicator a distance equal to approximately one-half the width of the ribbon of coating being applied. In this manner the ironing device presses out a given coated spot three times as described in the coating method application of David W. Boylan referred to heretofore.

It is of course to be understood that the details of structure and arrangement of parts may be variously changed and modified without departing from the spirit and scope of our invention.

We claim:

1. In pipe lining apparatus, pipe supporting means, means supported for movement within and without the pipe for applying a heavy ribbon of coating material, and means for bringing about relative movement between a pipe-to-be-coated and said applying means whereby said ribbon will assume helical form with the helices overlapping to the extent of one-half the width of the ribbon.

2. In pipe lining apparatus, pipe supporting means, means supported for movement within and without the pipe for applying a heavy ribbon of coating material, means to impart rotation to a pipe-to-be-coated, means for projecting said applying means longitudinally into and for withdrawing it longitudinally from said pipe whereby said ribbon will assume helical form, and means for controlling the timed relation of said rotative and longitudinal movement to cause the individual helices to overlap and thus simultaneously apply multiple coatings.

3. In pipe lining apparatus, pipe supporting means, pipe rotating means, means for applying a heavy ribbon of coating material, means for projecting said applying means longitudinally into and for withdrawing it longitudinally from a pipe-to-be-coated in definitely timed relation with the speed of rotation of said pipe, and means for independently varying the speed of rotation of said pipe and the speed of longitudinal movement of said applying means.

4. In pipe lining apparatus, pipe supporting means including rotation imparting rollers, coating material applying means movable longitudinally into and out of a pipe-to-be-coated, and means for lifting and shifting said pipe longitudinally onto said rollers.

5. In pipe lining apparatus, pipe supporting means including rotation imparting rollers, coating material applying means movable longitudinally into and out of a pipe-to-be-coated, and means for lifting and shifting said pipe longitudinally onto said rollers comprising a vertically effective pneumatic lifting means for lifting said pipe and a horizontally effective pneumatic shifting means for shifting said first mentioned pneumatic longitudinally.

6. In pipe lining apparatus, pipe supporting means including rotation imparting rollers, coating material applying means movable longitudinally into and out of a pipe-to-be-coated, means for lifting and shifting said pipe longitudinally onto said rollers comprising a vertically effective pneumatic lifting means for lifting said pipe and a horizontally effective pneumatic shifting means for shifting said first mentioned pneumatic longitudinally, and pressure operated hold-down means removably engageable with said pipe in opposition to said rollers for securing the pipe in position thereon.

7. In pipe lining apparatus, pipe supporting means including rotation imparting rollers, coating material applying means movable longitudinally into and out of a pipe-to-be-coated, and hold-down means removably engageable with said pipe in opposition to said rollers for securing the pipe in position thereon and including a plurality of rollers individually or collectively engageable with said pipe.

8. In pipe lining apparatus, pipe supporting means including rotation imparting rollers, coating material applying means movable longitudinally into and out of a pipe-to-be-coated, means for lifting and shifting said pipe longitudinally onto said rollers comprising a vertically effective pneumatic lifting means for lifting said pipe and a horizontally effective pneumatic shifting means for shifting said first mentioned pneumatic longitudinally, and pressure operated hold-down means removably engageable with said pipe in opposition to said rollers for securing the pipe in position thereon and including a plurality of rollers individually or collectively engageable with said pipe.

9. In pipe lining apparatus, pipe supporting means, pipe rotating means, means for applying a heavy ribbon of coating material, means for projecting said applying means longitudinally into and for withdrawing it longitudinally from a pipe-to-be-coated in definitely timed relation with the speed of rotation of said pipe, means for varying said speed relation, means for pumping coating material to the applying means, and means for varying the output of said pumping means.

10. In pipe lining apparatus, pipe supporting means, pipe rotating means, means for applying a heavy ribbon of coating material, means for projecting said applying means longitudinally into and for withdrawing it longitudinally from a pipe-to-be-coated in definitely timed relation with the speed of rotation of said pipe, means for pumping coating material to the applying means; and means for independently varying the speed of rotation of the pipe, the speed of longitudinal movement of the applying means, and the output of said pumping means.

11. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe trackage supported pipe, and trackage for supporting said truck and conduit.

12. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe trackage supported pipe, trackage for supporting said truck and conduit, and skids for feeding pipes-to-be-coated to and from the pipe trackage.

13. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe supported by said pipe supporting trackage, trackage for supporting said truck and conduit, feed-on skids at one side of the pipe trackage, feed-off skids at the opposite side of the pipe trackage, and kick-off devices for ejecting a coated pipe onto said feed-off skids.

14. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe supported by said pipe supporting trackage, trackage for supporting said truck and conduit, and a waste collecting unit disposed beneath each end of said trackage supported pipe.

15. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe supported by said pipe supporting trackage, trackage for supporting said truck and conduit, and a waste collecting unit disposed beneath each end of said trackage supported pipe, one said unit being mobile so that it can be properly positioned with respect to random lengths of pipes.

16. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe supported by said pipe supporting trackage, trackage for supporting said truck and conduit, a waste collecting unit disposed beneath each end of said trackage supported pipe, one said unit being mobile so that it can be properly positioned with respect to random lengths of pipes, and means carried by said mobile unit for controlling the stopping and starting and the direction of movement of said truck.

17. In pipe lining apparatus, pipe supporting trackage, means on the pipe trackage for supporting pipes for rotative and longitudinal movement, a coating material applicator, means including a flow conduit and a mobile truck for projecting said applicator into and withdrawing it from a pipe supported by said pipe supporting trackage, trackage for supporting said truck and conduit, a waste collecting unit disposed beneath each end of said trackage supported pipe, one said unit being mobile so that it can be properly positioned with respect to random lengths of pipes; and means located on said truck and approximately at each end of the pipe trackage for controlling the stopping and starting and the direction of movement of said truck.

18. In pipe lining apparatus, pipe supporting and rotating means comprising a pair of supporting and driving rollers, a supporting trackway, wheeled dollies movable along the trackway and each having idler pipe supporting rollers, pressure operated means carried by one dolly for lifting an end of a pipe supported on the rollers of the dollies, and pressure operated means to shift said lifting dolly longitudinally to place the pipe end on said driving rollers.

19. In pipe lining apparatus, pipe supporting and rotating means comprising a pair of supporting and driving rollers, a supporting trackway, wheeled dollies movable along the trackway and each having idler pipe supporting rollers, pressure operated means carried by one dolly for lifting an end of a pipe supported on the rollers of the dollies, pressure operated means to shift said lifting dolly longitudinally to place the pipe end on said driving rollers, and pressure actuated means to hold said pipe end against said driving rollers.

20. In pipe lining apparatus, pipe supporting and rotating means comprising a pair of supporting and driving rollers, a supporting trackway, wheeled dollies movable along the trackway and each having idler pipe supporting rollers, pressure operated means carried by one dolly for lifting an end of a pipe supported on the rollers of the dollies, pressure operated means to shift said lifting dolly longitudinally to place the pipe end on said driving rollers, and pressure actuated means to hold said pipe end against said driving rollers including a pair of pressure rollers individually or collectively engageable with said pipe end.

21. In pipe lining apparatus, pipe supporting and rotating means comprising a pair of supporting and driving rollers, a supporting trackway, wheeled dollies movable along the trackway and each having idler pipe supporting rollers, pressure operated means carried by one dolly for lifting an end of a pipe supported on the rollers of the dollies, pressure operated means to shift said lifting dolly longitudinally to place the pipe end on said driving rollers, feed-on skids for delivering pipes-to-be-coated to the dollies, feed-off skids for receiving coated pipes, and ejecting means for delivering coated pipes from the dollies to the feed-off skids.

22. In pipe lining apparatus, pipe supporting and rotating means comprising a pair of supporting and driving rollers, a supporting trackway, wheeled dollies movable along the trackway and each having idler pipe supporting rollers, pressure operated means carried by one dolly for lifting an end of a pipe supported on the rollers of the dollies, pressure operated means to shift said lifting dolly longitudinally to place the pipe end on said driving rollers, feed-on skids for delivering pipes-to-be-coated to the dollies, feed-off skids for receiving coated pipes, ejecting means for delivering coated pipes from the dollies to the feed-off skids, and individual control devices grouped at one end of the trackway for controlling the rotation and speed of rotation of the pipe, lifting and longitudinal shifting of said pipe, and the ejecting means.

23. In a pipe lining machine, an applicator for flowing a heavy ribbon of coating material onto the interior of a pipe-to-be-coated, means for reciprocating the applicator in a pipe, and means for supplying coating material to said applicator including a container, and a conduit including flow and return passages for flowing material to the applicator and for returning unused material to said container.

24. In a pipe lining machine, an applicator for flowing a heavy ribbon of coating material onto the interior of a pipe-to-be-coated, means for reciprocating the applicator in a pipe, and means for supplying coating material to said applicator including a container, a conduit including flow and return passages for flowing material to the applicator and for returning unused material to said container, a valve for controlling the entrance of material into the applicator, and a pump for feeding material from the container into the flow passage.

25. In a pipe lining machine, a mobile coating material container, applicator and a connecting conduit, spaced supporting trackways, casters for supporting said conduit on the trackways, and means for varying the spacing of the trackways and the angular projection of said casters.

26. In a pipe lining machine, a mobile coating material container, applicator and a connecting conduit, spaced supporting trackways, casters for supporting said conduit on the trackways, a truck on which said container is supported and to which said conduit is connected, and trackways for supporting said truck.

27. In a pipe lining machine, an applicator for flowing a heavy ribbon of coating material onto the interior of a pipe-to-be-coated, means for reciprocating the applicator in a pipe and means for supplying coating material to said applicator including a container, a conduit including flow and return passages for flowing material to the applicator and for returning unused material to said container, a heat insulating covering for said conduit, and a heating means encircling said conduit within said covering.

28. In a pipe lining machine, a mobile coating material container, applicator and a connecting conduit, spaced supporting trackways, casters for supporting said conduit on the trackways, a wheeled truck on which said container is supported and to which said conduit is connected, trackways for supporting said truck, an electric motor and power transmitting connections for imparting rotation to certain of said truck wheels, a supporting line disposed parallel said truck trackway, and a power line for the motor carried by said supporting line.

29. In a pipe lining machine, a mobile coating material container, applicator and a connecting conduit, spaced supporting trackways, casters for supporting said conduit on the trackways, pairs of blocks supporting said trackways, and a reversely threaded screw passing transversely through each pair of blocks and serving when rotated in one direction or another to increase or diminish the spaced relation of the trackways.

30. In a pipe lining apparatus, a mobile applicator, a conduit for feeding coating material to said applicator, stemmed casters for supporting the conduit and means for mounting the casters to permit adjustment of their angles of projection including a conduit encircling ring for each caster having a radially projecting arm slotted to adjustably receive the stem of a caster, means to secure the ring on the conduit, and means to secure the stem on the arm.

31. In pipe lining apparatus, pipe supporting means, pipe rotating means, a coating material applicator, an applicator supporting trackway aligned with the pipe supporting means, means for feeding the applicator along the trackway to project the applicator into and withdraw it from the pipe, and means for supporting the applicator on the trackway and upon an internal surface of said pipe.

32. In pipe lining apparatus, pipe supporting means, pipe rotating means, a coating material applicator, an applicator supporting trackway aligned with the pipe supporting means, means for feeding the applicator along the trackway to project the applicator into and withdraw it from the pipe, and means for supporting the applicator on the trackway and upon an internal surface of said pipe, said last named means including casters depending from said applicator.

33. In pipe lining apparatus, pipe supporting means, pipe rotating means, a coating material applicator, an applicator supporting trackway aligned with the pipe supporting means, means for feeding the applicator along the trackway to project the applicator into and withdraw it from the pipe, means for supporting the applicator on the trackway and upon an internal surface of said pipe, and means for individually varying the speeds of rotation of the pipe and of longitudinal movement of the applicator.

DAVID W. BOYLAN.
CLIFFORD F. MORAIN.
OTTO R. BOWMAN.